W. H. & D. D. POLLEYS.
Plumb Level.
No. 40,428. Patented Oct. 27, 1863.
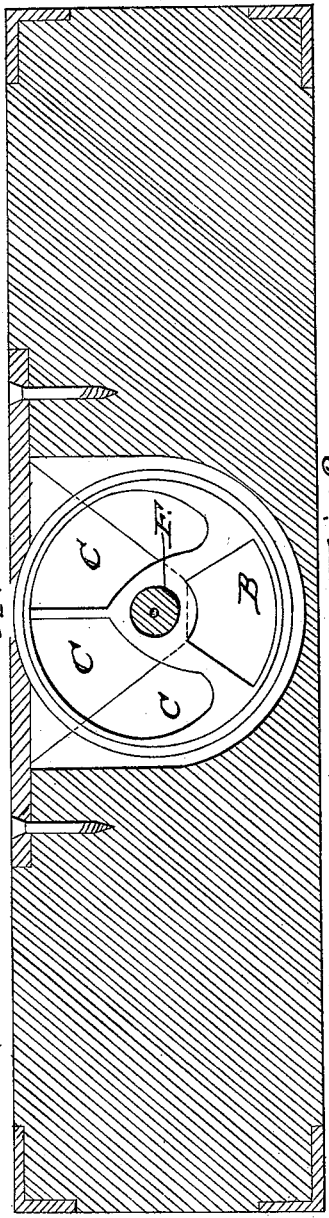
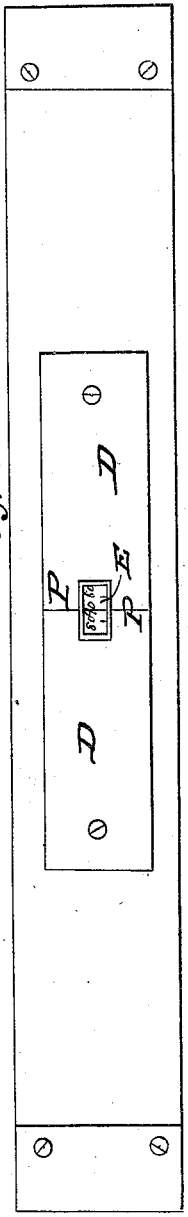
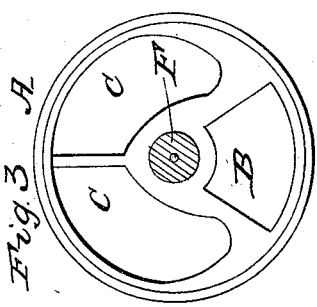
Witnesses
D. D. M. Mellan
E. F. Wilson
Inventors
Wm H. Polleys
David D. Polleys

UNITED STATES PATENT OFFICE.

WILLIAM H. POLLEYS AND DAVID D. POLLEYS, OF LA CROSSE, WISCONSIN.

IMPROVEMENT IN PLUMB-LEVELS.

Specification forming part of Letters Patent No. 40,428, dated October 27, 1863.

*To all whom it may concern:*

Be it remembered that we, WILLIAM H. POLLEYS and DAVID D. POLLEYS, of the city of La Crosse, county of La Crosse, and State of Wisconsin, have invented a new and useful Machine for Taking Levels, Angles, and Perpendiculars; and we do hereby declare that the following is a full, clear, and exact description of the construction and operation of the same, reference being had to the annexed drawings, making a part of this specification, in which—

Figure 1 is a sectional view of the level-stock and machinery. Fig. 2 is a view of the face of the level-stock, and Fig. 3 is a sectional view of the wheel.

The annexed drawings represent a level-stock, in the center of which is a socket into which is inserted a wheel two and one-half inches in diameter. A portion of the wheel (marked B) is filled in with lead. The other portions of the wheel (marked C) are open. The wheel revolves on a steel pivot (marked F.) A portion of the face of the wheel is marked off into degrees from ninety degrees to zero on each side of a point marked A.

D represents face of brass socket-frame, four and one-half inches long and one inch wide, with an opening in the center E. In the center of the socket-frame is engraved a straight line, P. When the stock is level, the figure 90 on the wheel will correspond with the line P. When perpendicular, the line P will correspond with 0 on the wheel, and so on from ninety degrees to zero.

We claim—

The wheel, Fig. 3, with the socket, constructed, arranged, and operating in the manner set forth.

WM. H. POLLEYS.
DAVID D. POLLEYS.

Witnesses:
D. D. McMILLAN,
E. F. WILSON.